US011137479B1

(12) United States Patent
Kramer et al.

(10) Patent No.: US 11,137,479 B1
(45) Date of Patent: Oct. 5, 2021

(54) PRODUCT SPECIFIC CORRECTION FOR A SENSOR-BASED DEVICE

(71) Applicant: Amazon Technologies, Inc., Seattle, WA (US)

(72) Inventors: Allison Kramer, Seattle, WA (US); Samuel Stevens Heyworth, Seattle, WA (US); Devon Merritt, Seattle, WA (US); Amirali Virani, Bellevue, WA (US); Hannah McClellan Richards, Boise, ID (US)

(73) Assignee: Amazon Technologies, Inc., Seattle, WA (US)

(*) Notice: Subject to any disclaimer, the term of this patent is extended or adjusted under 35 U.S.C. 154(b) by 746 days.

(21) Appl. No.: 15/926,779

(22) Filed: Mar. 20, 2018

(51) Int. Cl.
*G01S 7/48* (2006.01)
*G01S 17/08* (2006.01)

(52) U.S. Cl.
CPC ............ *G01S 7/4808* (2013.01); *G01S 17/08* (2013.01)

(58) Field of Classification Search
CPC .............................. G01S 7/4808; G01S 17/08
See application file for complete search history.

(56) References Cited

U.S. PATENT DOCUMENTS

| | | | |
|---|---|---|---|
| 5,168,445 A | 12/1992 | Kawashima et al. | |
| 5,235,509 A | 8/1993 | Mueller et al. | |
| 6,204,763 B1 | 3/2001 | Sone | |
| 6,799,085 B1 | 9/2004 | Crisp, III | |
| 7,542,866 B1* | 6/2009 | Lovegren ............. | G01F 23/284 340/618 |
| 8,005,761 B1 | 8/2011 | Braumoeller et al. | |
| 8,260,672 B2 | 9/2012 | Weel et al. | |
| 8,718,620 B2 | 5/2014 | Rosenblatt | |
| 9,267,834 B2 | 2/2016 | Chowdhary et al. | |
| 9,619,831 B1 | 4/2017 | Kumar et al. | |
| 10,360,617 B2 | 7/2019 | High et al. | |
| 10,438,276 B2 | 10/2019 | Godsey et al. | |
| 10,445,672 B2 | 10/2019 | Renfroe | |

(Continued)

FOREIGN PATENT DOCUMENTS

| | | |
|---|---|---|
| WO | 2016149674 | 9/2016 |
| WO | 2017118845 | 7/2017 |

OTHER PUBLICATIONS

PCT/US2019/022215, "International Search Report and Written Opinion", dated Apr. 29, 2019, 11 pages.

(Continued)

*Primary Examiner* — Catherine T. Rastovski
*Assistant Examiner* — Liam R Casey
(74) *Attorney, Agent, or Firm* — Kilpatrick Townsend & Stockton LLP

(57) ABSTRACT

Utilizing the techniques disclosed herein, sensor data inaccuracies may be corrected such that calculated fill levels more accurately reflect the actual fill level of the item within an automatic replenishment device (ARD). For example, the ARD may include a sensor configured to collect the sensor data (e.g., a distance between the sensor and an item contained within the ARD). Sensor data associated with an item within the ARD may be received. A measurement offset value specific to the item may be identified. An estimated fill level of the item within the ARD may be calculated based at least in part on the distance measured between the sensor and the item and the measurement offset value specific to the item.

19 Claims, 9 Drawing Sheets

(56) References Cited

U.S. PATENT DOCUMENTS

| | | |
|---|---|---|
| 10,445,819 B2 | 10/2019 | Renfroe |
| 10,474,987 B2 | 11/2019 | Corona et al. |
| 2006/0206373 A1 | 9/2006 | Blair et al. |
| 2007/0162326 A1 | 7/2007 | Weel et al. |
| 2008/0113614 A1 | 5/2008 | Rosenblatt |
| 2010/0076903 A1 | 3/2010 | Klingenberg et al. |
| 2011/0153466 A1 | 6/2011 | Harish et al. |
| 2012/0038456 A1 | 2/2012 | Pikkarainen et al. |
| 2013/0038455 A1 | 2/2013 | Chowdhary et al. |
| 2013/0231877 A1* | 9/2013 | Weber ............... G01F 23/284 702/55 |
| 2013/0300595 A1* | 11/2013 | Hemmendorff ....... G01F 23/284 342/124 |
| 2014/0095479 A1 | 4/2014 | Chang et al. |
| 2014/0203040 A1 | 7/2014 | Clark et al. |
| 2015/0142621 A1 | 5/2015 | Gray et al. |
| 2015/0178654 A1 | 6/2015 | Glasgow et al. |
| 2015/0186836 A1 | 7/2015 | Chouhan et al. |
| 2015/0278912 A1 | 10/2015 | Melcher et al. |
| 2015/0302510 A1 | 10/2015 | Godsey et al. |
| 2015/0329260 A1 | 11/2015 | Singh |
| 2016/0019780 A1 | 1/2016 | Gettings et al. |
| 2016/0040580 A1 | 2/2016 | Khaled et al. |
| 2016/0132821 A1 | 5/2016 | Glasgow et al. |
| 2016/0134930 A1 | 5/2016 | Swafford |
| 2016/0180239 A1 | 6/2016 | Frankel et al. |
| 2016/0203431 A1 | 7/2016 | Renfroe |
| 2016/0229678 A1 | 8/2016 | Difatta et al. |
| 2016/0314514 A1 | 10/2016 | High et al. |
| 2016/0347540 A1 | 12/2016 | Skocypec et al. |
| 2017/0070523 A1 | 3/2017 | Bailey et al. |
| 2017/0201057 A1 | 7/2017 | Ahlawat et al. |
| 2017/0300984 A1 | 10/2017 | Hurwich |
| 2018/0053140 A1 | 2/2018 | Baca et al. |
| 2018/0164143 A1 | 6/2018 | Gurumohan et al. |
| 2018/0165627 A1 | 6/2018 | Jones et al. |
| 2018/0260779 A1 | 9/2018 | Singh et al. |
| 2018/0308514 A1 | 10/2018 | Li et al. |
| 2019/0108483 A1 | 4/2019 | Tineo |
| 2020/0105409 A1 | 4/2020 | Kochar et al. |

OTHER PUBLICATIONS

U.S. Appl. No. 15/918,205, titled "Managing Shipments Based on Data From a Sensor-Based Automatic Replenishment Device," filed Mar. 12, 2018.

U.S. Appl. No. 15/927,324, titled "Managing Electronic Requests Associated With Items Stored by Automatic Replenishment Devices," filed Mar. 21, 2018.

U.S. Appl. No. 15/927,946, titled "Automatic Replenishment of Items Utilizing a Sensor-Based Device," filed Mar. 21, 2018.

U.S. Appl. No. 15/927,990, titled "Order Quantity and Product Recommendations Based on Sensor Data," filed Mar. 21, 2018.

U.S. Appl. No. 15/927,998, titled "Predictive Consolidation System Based on Sensor Data," filed Mar. 21, 2018.

U.S. Appl. No. 15/928,370, titled "Product and Lid Identification for Sensor-Based Device," filed Mar. 22, 2018.

U.S. Appl. No. 15/928,409, titled "LED Enhanced Product and Lid Identification for Sensor-Based Device," filed Mar. 22, 2018.

U.S. Appl. No. 15/934,780, titled "Test-Enabled Measurements for a Sensor-Based Device," filed Mar. 23, 2018.

U.S. Appl. No. 15/963,761, titled "Sensor-Related Improvements to Automatic Replenishment Devices," filed Apr. 26, 2018.

Griffiths, "Never Run Out of Food Again! Smart Mat Warns You When You're Low on Milk While Fridge Cam Lets you Remotely Check What you Already Have During your Weekly Shop," Available online at http://www.dailymail.co.uk/sciencetech/article-3385278/Never-run-food-Smart-mat-tells-low-milk-fridge-cam-shows-s-inside-shopping.html, Jan. 5, 2016, 8 pages.

Li et al., "Discussion of Principle and Application for Internet of Things", Applied Mechanics and Materials, vol. 347-350, 2013, pp. 3322-3325.

Welch et al., "Seven Keys to ERP Success", Strategic Finance, vol. 89, No. 3, Institute of Management Accountants, Sep. 2007, pp. 41-61.

U.S. Appl. No. 15/696,040, titled "Sensor Data-Based Reordering of Items," filed Sep. 5, 2017.

"Amazon Dash Replenishment", XP054979477, Available online at: https://www.youtube.com/watch?v=vTYcWG6BIDY, Jan. 19, 2016, 3 pages.

"Amazon Dash Replenishment for Developers", XP054979476, Available online at: https://www.youtube.com/watch?v=WS42WcuSyVU, Jan. 30, 2017, 5 pages.

\* cited by examiner

PRODUCT SPECIFIC CORRECTION FOR A SENSOR-BASED DEVICE

BACKGROUND

Online retailers as well as brick and mortar retailers offer subscription services that deliver items to customers on a periodic basis. However, services such as subscriptions can deliver items even when the customer has not fully consumed previously-delivered items resulting in a build-up of the item at the customer's home or workplace. Conventional static subscription and delivery services fail to account for varied consumption of the item by the customer. For example, current replenishment techniques may utilize a static frequency at which an item is to be provided regardless of the rate of consumption actually realized by the customer. Although the user may modify the static frequency, subscription service typically require the customer to take proactive action to modify a subscription and/or place a reorder for an item. Conventionally, as a customer depletes a supply of an item, or nearly depletes the supply, the customer may place a new order for more supply of the product by interacting with a website associated with an online marketplace and/or utilizing a mobile application associated with an entity that facilitates the order/purchase of the product. Thus, conventional techniques for item replenishment include inefficiencies and inaccuracies which make accurate item replenishment difficult.

BRIEF DESCRIPTION OF THE DRAWINGS

Various embodiments in accordance with the present disclosure will be described with reference to the drawings, in which.

DETAILED DESCRIPTION

Figure 1:
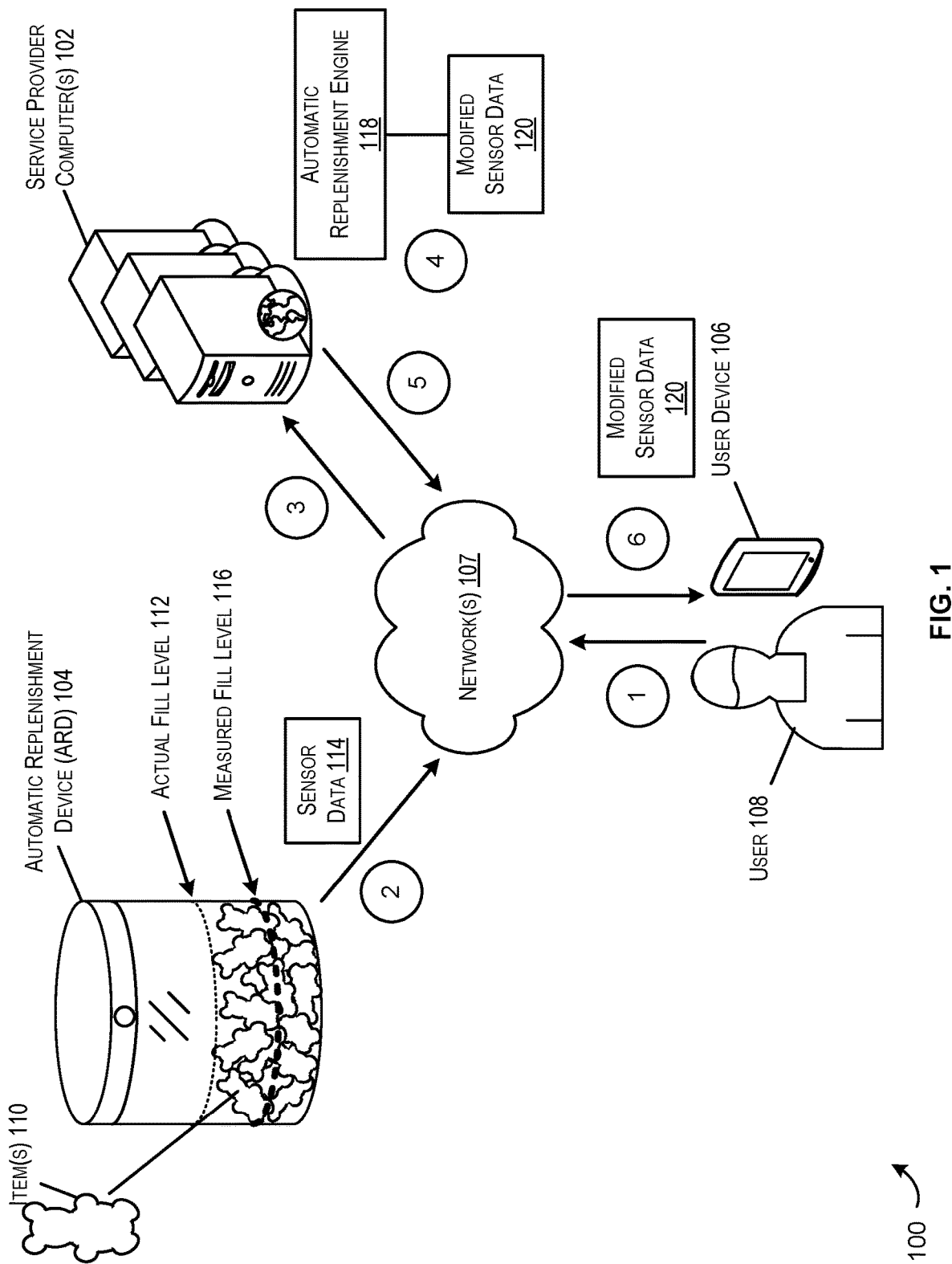
FIG. 1 illustrates a workflow for providing sensor data corrections that includes service provider computers, an automatic replenishment device (ARD), and a user device, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide systems and methods for providing sensor data corrections. In at least one embodiment, various sensors (e.g., time-of-flight (ToF) sensors) of an automatic replenishment device (ARD) may be utilized to collect sensor data related to an item stored by the ARD (e.g., situated on or within the ARD). A ToF sensor may resolve distance based on the known speed of light, measuring the time-of-flight of a light signal between the sensor and an object. In some examples, the ARD may include a container and a lid. One or more ToF sensors may be affixed to the lid (or another suitable portion of the ARD). A ToF sensor may be configured to measure the distance between the sensor and an object (e.g., the bottom of a container of the ARD or an item situated on/within the container). The sensor may also be configured to output a signal return rate indicating an amount of light returning to the sensor from a given light emission.

In some embodiments, the sensor data may be provided (e.g., by the ARD) to one or more service provider computers. The service provider computers may utilize the sensor data to determine an amount, volume, and/or quantity of the item within the ARD (e.g., within the container). When the item within the ARD drops below a threshold amount, the service provider computers may perform one or more remedial actions. A remedial action may include, but is not limited to, presenting a current fill level of the item within the ARD, generating an order to replenish the item (e.g., to purchase an item from a provider and/or deliver the item to the user), providing a notification related to the fill level (e.g., via an email, a text message, a website, a push notification, etc.), or the like.

In some embodiments, the ToF sensors may include some degree of error. For example, such sensors may have difficulty producing accurate sensor data when the items within the ARD have some amount of transmissivity. "Transmissivity" is intended to refer to the degree to which a medium (e.g., an item) allows light to pass through it. Items that have at least some transmissivity (e.g., gummi bears, rice, noodles, cereal, beef jerky, etc.) may not be accurately "seen" by the sensors. Sensor data inaccuracies due to transmissivity may lead to inaccurate assessment/calculations with respect to how much of an item is remaining in the ARD. By way of example, a sensor collecting sensor data related to a volume of gummi bears may measure a distance that is inaccurately large given that the light emitted from the sensor was able to pass through the gummi bears to some degree. Should the inaccurately large distance measurement be used to calculate an actual fill level of the gummi bears within the ARD, the calculated fill level may be inaccurately low. Thus, a remedial action (e.g., fill level presentation, notification transmission, item replenishment, etc.) may occur that may unnecessarily waste processing resources, provide inaccurate data, and/or create an unpleasant user experience.

In some embodiments, sensor data collected when the fill level of the item is relatively low may be more accurate than when the fill level of the item is higher. This may be due to the sensor being able to sense the bottom of the ARD when the fill level approaches zero. Thus, sensor data associated with such items may be more accurate when the fill level of the item within the ARD is at or under a threshold amount (e.g., less than 10% full, 15% full, etc.).

Techniques described herein relate to correcting sensor data associated with items with some amount of transmissivity in order to avoid wasteful processing and/or presenting misleading fill level information due to inaccurate sensor data. In at least one embodiment, sensor data may be transmitted (e.g., by the ARD) to one or more service provider computers. The service provider computers may be configured to determine a particular item that is associated with the ARD (e.g., via a user profile maintained by the service provider computers).

In some embodiments, the sensor data associated with the item may be adjusted in an item-specific manner. For example, a predetermined mapping may be maintained by the service provider computers. The predetermined mapping may identify an item, a material-specific offset associated with the item, and a material-specific signal return rate (SRR) associated with the item. A material-specific offset (also referred to as a "material-specific offset value," and a "measurement offset value") may refer to an amount of known and/or calculated sensor data error (e.g., 20%) associated with the item. A "material-specific SRR" may be a predetermined value that indicates an expected SRR when the specific item fills a particular amount (e.g., 20%) of a similar ARD. The values contained within the mapping may be derived from any suitable method such as, but not limited to, controlled testing, customer test measurement, machine learning (e.g., prediction from similar materials), or the like.

In at least one embodiment, sensor data including a distance measurement and a measured SRR may be provided to the service provider computers from the ARD. Upon receipt, the service provider computers may be configured to consult the mapping to obtain a material-specific offset. The mapping may indicate that a particular item (e.g., gummi bears) is associated with a material-specific offset of 20% (indicating that distance measurements of gummi bears typically contains a 20% error). The service provider computers may be configured to add the material-specific offset to the measured distance provided in the sensor data to compensate for the error. However, as mentioned above, the full amount of the material-specific offset may not be needed if the fill level of gummi bears within the ARD is relatively low (e.g., the bottom of the ARD may be visible). Accordingly, rather than adding the material-specific offset immediately to the distance measurement, an offset scale may be used to scale how much of the material-specific offset is added to the distance measurement. The offset scale may be calculated to be a value of 1 for fill levels over a particular threshold (e.g., 10% fill level, 15% fill level, etc.). For fill levels under the particular threshold, the offset scale may be calculated to be a value under 1 (or 0 for an empty container) such that only a percentage of the material-specific offset is added to the distance measurement. The offset scale enables the sensor data to be adjusted such that accurate fill levels may be calculated even when the ARD is approaching empty.

It should be appreciated that although examples herein may utilize a mapping of known material-offset values, the same examples may equally apply to use cases in which a material-offset value for the particular item is initially unknown. When the material-offset value for a particular item is unknown, the material-offset value may be calculated or derived from other known material-offset values. By way of example, an item (e.g., particular brand of gummi bears) may not be associated with a material-offset value, but the system may utilize the mapping to determine a material-offset value for a similar item (e.g., another brand of gummi bears, another type of item with similar transmissivity, etc.). The material-offset value for the similar item may be used as a substitute material-offset value for the item. In order to determine whether two items are similar for the purposes of determining a substitute material offset value for the item, attributes of the item (e.g., weight, material, dimensions, product description, transmissivity rating, etc.) may be compared to the attributed of other item. Through this comparison, a similarity score may be calculated for each pair of items that quantified a degree to which the two items are similar. The system may then identify a similar item based on the similarity scores (e.g., a pairing between the item and another item that has a highest similarity score).

Additionally, or alternatively, in any examples provided herein, the system may prompt the user for input in order to calculate a material-offset value for the item. For example, the user may be prompted to fill the ARD to some amount (e.g., 20%, 30%, etc.). The sensor(s) of the ARD may be stimulated (e.g., via user input, via input provided at the ARD such as closing a lid, initiated by the service provider computers, etc.) to collect sensor data for the item. Given that the fill level (e.g., 20%) is known, the sensor data collected may be utilized to determine the material-offset for the item. That is, if the sensor data is used to calculate an estimated fill level of 35%, the system may determine that the material-offset for the item is 15% (e.g., indicating an error of approximately 15%). In some embodiments, material-offset values calculated in this manner may be added to the mapping at any suitable time such that the calculated material-offset value for the item may be retrieved from the mapping rather than being recalculated for future operations.

FIG. 1 illustrates a workflow 100 for providing sensor data corrections that includes service provider computer(s) 102, an automatic replenishment device (ARD) 104, and a user device 106, in accordance with at least one embodiment. The service provider computer(s) 102, the ARD 104, and the user device 106 may be configured to communicate with one another via network(s) 107 (e.g., a local area network, a wide area network, a cellular network, the Internet, or the like) via any suitable communications protocol.

Prior to performance of the workflow 100, the user 108 may utilize any suitable means for obtaining an item(s) 110 (e.g., some number of gummi bears). For example, the user 108 may utilize to browse an electronic marketplace for gummi bears. The electronic marketplace may be hosted by the service provider computer(s) 102 and/or another suitable system. Utilizing interfaces provided by the electronic marketplace, the user 108 may purchase the gummi bears which may then be delivered to the user 108 utilizing any suitable shipping methods. It should be appreciated that the item(s) 110 may be obtained using other means (e.g., purchased from a retail store, received as a gift, etc.).

Once obtained, the item(s) 110 may be placed on/in the ARD 104. In some embodiments, the ARD 104 may include a container and a lid as depicted in FIG. 1. The lid may include one or more time-of-flight (ToF) sensors. Once placed within the ARD 104 as depicted in FIG. 1, the item(s) 110 may fill the ARD 104 to some level (e.g., an actual fill level 112).

At step 1 of the workflow 100, the user 108 may utilize the user device 106 to perform a process for associating the item(s) 110 with the ARD 104. For example, the user device 106 may be utilized to access an application and/or website (e.g., hosted by the service provider computer(s) 102) to perform an association process. During the association process, the user device 106 (e.g., via the application and/or website) may be utilized to provide account information such as a name, a shipping address, billing information, or the like. Alternatively, the user device 106 may be utilized to sign in to a user profile maintained by the service provider computer(s) 102 in order to access previously stored account information. During the association process, the user device 106 may be utilized to associate the item(s) 110 with the ARD 104. As a non-limiting example, an identifier (e.g., a serial number, bar code, or other suitable identifier) of the ARD 104 may be entered, scanned, and/or selected at the user device 106. An item identifier may also be entered, scanned, and/or selected at the user device 106. The user device 106 may then be utilized to provide an indication that the item identifier of the item(s) 110 is to be associated with the identifier of the ARD 104. The association between the item(s) 110 and the ARD 104 may be stored by the service provider computer(s) 102 (e.g., as part of the user profile associated with the user 108 and/or user device 106). In the example depicted in FIG. 1, the item(s) 110 may include some amount of transmissivity.

It should be appreciated that, in some examples the user 108 and the user device 106 may not perform the association process at step 1. For example, a camera or other suitable sensor located on the ARD 104 may be utilized to collect sensor data that may be utilized to identify (e.g., by the service provider computer(s) 102 via image recognition techniques) the particular item currently being stored within the ARD 104. Once an item has been identified via the sensor data, the service provider computer(s) 102 may be configured to create an association between the item being stored and the ARD 102. Thus, the process for associating the item and the ARD 104 may be performed independent of the user 108 and/or the user device 106.

At step 2 of the workflow 100, sensor data 114 may be transmitted by the ARD 104 (e.g., via one or more ToF sensors of the ARD 104). The sensor data 114 may be collected and/or at any suitable time according to a predetermined schedule, at periodic time intervals, upon sensing user interaction with the item(s) 110 and/or the ARD 104, upon user input entered at the ARD 104, upon instruction from the service provider computer(s) 102 and/or the user device 106, or at any suitable time. The sensor data 114 may indicate a distance measurement that corresponds to the measure fill level 116.

At step 3, the service provider computer(s) 102 may receive the sensor data 114. The sensor data 114 may include a measured distance between the sensor and the item(s) 110 and a signal return rate (SRR) indicating some amount of light returned to the sensor given a particular light emission. The service provider computer(s) 102 may include an automatic replenishment engine 118.

At step 4, the automatic replenishment engine 118 may generate modified sensor data 120 from the sensor data 114 received at step 3. For example, the automatic replenishment engine 118 may calculate an offset scale based at least in part on the received SRR, a predetermined empty container SRR, and a predetermined material-specific SRR. The offset scale may be a value between 0 and 1. Once determined, the offset scale may be applied to a material-specific offset value associated with the item(s) 110. The automatic replenishment engine 118 may add the scaled material-specific offset value to the measured distance received at step 3 to calculate an adjusted distance measurement. The automatic replenishment engine 118 may then perform operations to convert the adjusted distance measurement to a calculated fill level for the item(s) 110 in the ARD 104. The modified sensor data 120 may be calculated in this fashion so as to provide a fill level than more closely matches the actual fill level 112 than the measured fill level 116 indicated by the sensor data 114.

At step 5, the modified sensor data 120 may be provided by the service provider computer(s) 102 via the network(s) 107. For example, the service provider computer(s) 102 may present the calculated fill level of the item(s) 110 within the ARD 104 at an application and/or website hosted by the service provider computer(s) 102.

At step 6, the modified sensor data 120 may be provided/rendered at the user device 106 for display to the user 108. Thus, the user 108 may view the calculated fill level of the item(s) 110 with the ARD 104 via user device 106.

Although not depicted in FIG. 1, many additional or alternative workflows are contemplated. For example, the modified sensor data 120 may be utilized by the automatic replenishment engine 118 to cause performance of any suitable number of remedial actions including notifying the user 108 of the calculated fill level via the user device 106, generating an order for the item(s) 110 based at least in part on the calculated fill level, etc.

If the sensor data 114 been used rather than the modified sensor data 120, the automatic replenishment engine may perform any of the various remedial action discussed based on the measured fill level 116. By utilizing the modified sensor data 120 and the corresponding calculated fill level which more closely matches the actual fill level 112, the user 108 may be presented/provided a more accurate view of the amount of the item(s) 110 left in the ARD 104. Additionally, by utilizing the more accurate modified sensor data 120 the automatic replenishment engine 118 may avoid needless processing of one or more remedial actions (e.g., generating an order) that may have been caused by the inaccuracies of the sensor data 114.

Figure 2:
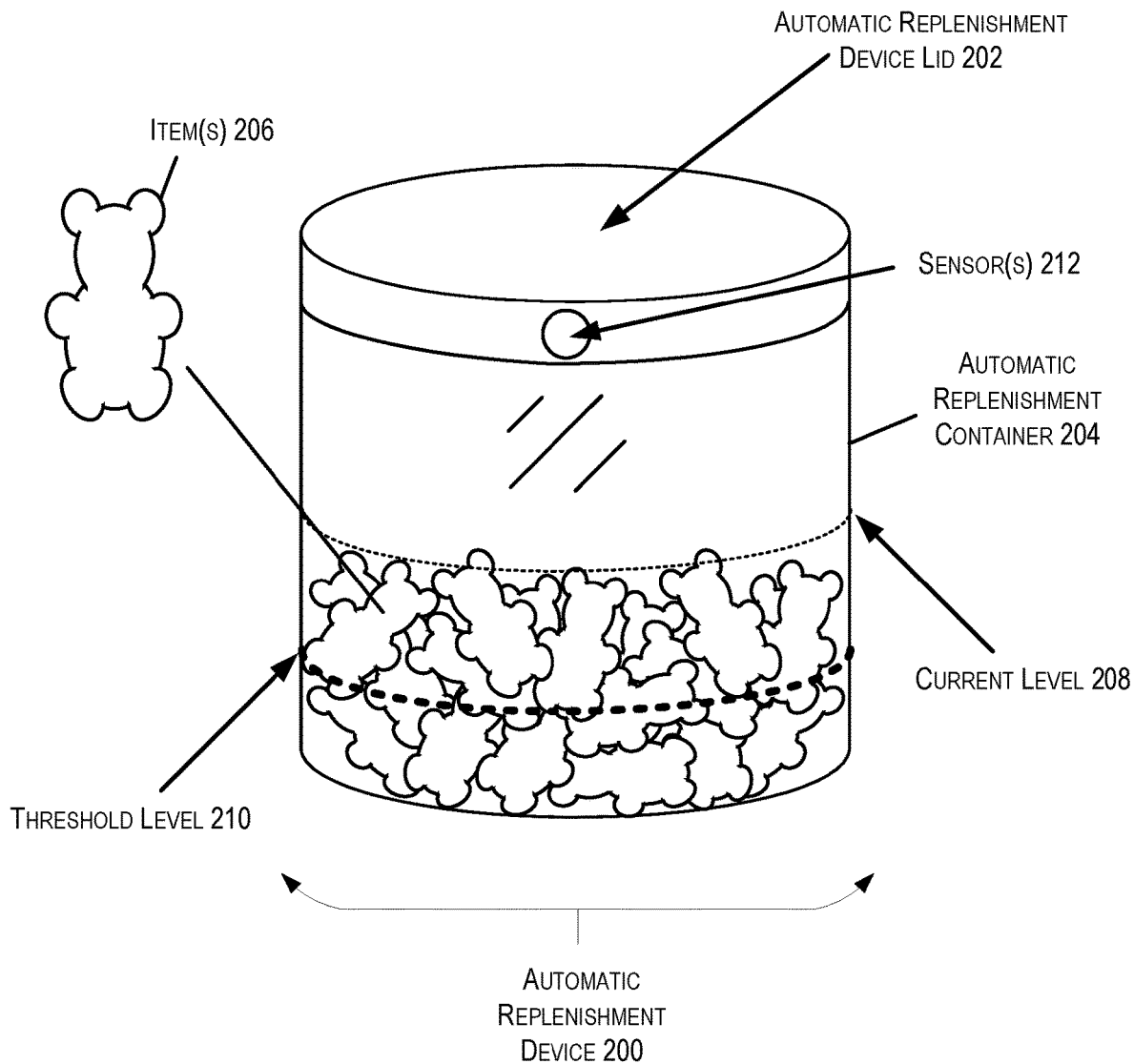
FIG. 2 illustrates an example ARD with items placed within the ARD, in accordance with at least one embodiment.

FIG. 2 illustrates an example ARD with items placed within the ARD, in accordance with at least one embodiment. FIG. 2 includes ARD 200 (e.g., an example of the ARD 104 of FIG. 1) that includes an ARD lid 202, and an ARD container 204. One or more item(s) 206 (e.g., gummi bears, coffee grounds, liquid detergent, flour, candy, pretzels, rice, etc.), may be stored within the ARD container 204. FIG. 2 also includes visual representations for a current level of the item(s) 206 at 208 and a threshold level 210. It should be noted that although the ARD 200 of FIG. 2 includes visual representations of a current level of item at 208 and a threshold level 210, these depictions are for clarification of aspects of the embodiments described herein. For example, a current level of item 208 may be determined by service provider computer(s) 102 of FIG. 1 based on sensor data obtained by sensor(s) 212 and maintained in a user profile that is generated and stored by the service provider computer(s) 102. As described herein, the threshold level 210 may be determined by the service provider computer(s) 102 based on the consumption data that is derived from the sensor data obtained by the sensor(s) 212 where the threshold level 210 is stored and associated with a user profile maintained by the service provider computer(s) 102.

It should be noted that the ARD 200 of FIG. 2 represents a container which may be of any shape, depth, or size, in which item(s) 206 are placed within. In embodiments, the ARD 200 may include one or more sensor(s) 212 that may be configured to determine a distance of the item(s) 206 that are currently situated within the ARD container 204 of the ARD 200 (i.e., capture or obtain distance measurements between the one or more sensor(s) 212 and the item(s) 206). The sensor(s) 212 may include a time of flight sensor (e.g., a time of flight camera, a time of flight transmitter and receiver combination, etc.), that is configured to determine/detect a distance/amount of item(s) 206 placed in the ARD container 204 of the ARD 200 based at least in part on the time of flight for a signal to be emitted from the one or more sensor(s) 212 to a current level of the item(s) 206 (e.g., 208) or to a surface area of the item(s) 206. In accordance with at least one embodiment, the sensor data collected by the one or more sensor(s) 212 may include distance measurements identifying a distance between the item(s) 206 and one or more sensor(s) 212. The sensor data may include the raw data that was obtained by the sensor(s) 212 and/or the sensor data may include values that represent a conversion from the raw data to any suitable format and/or unit of measurement.

The sensor data may indicate a current distance, amount, and/or volume of the item(s) 206 situated within the ARD container 204. For example, the sensor data may indicate a current distance (e.g., 140 mm, 5.5 inches, etc.) between the one or more sensor(s) 212 and the item(s) 206. The sensor data may indicate a current a current volume of the item(s) (e.g., 57.75 cubic inches, 39.23 cubic inches, etc.) and/or an item number or quantity that indicates a number or quantity of the item(s) 206 situated within the ARD container 204 of ARD 200. The ARD 200 and sensor(s) 212 may be configured to utilize any suitable time of flight signal technology between the sensor(s) 212 and the item(s) 206. Although the ARD 200 of FIG. 2 includes the sensor(s) 212 within or on a surface of the ARD lid 202, the sensor(s) 212 may be placed on one or more interior surfaces of the ARD container 204. In at least one embodiment, the ARD lid 202 may be configured to be placed on any suitable container.

Time of flight signal technology can include any electronic signal technology that can determine the elapsed time period between a transmission of a signal from a source and a return of the signal, or at least a portion thereof, back to the source. Other configurations such as a signal source and signal detector may also be utilized to determine time of flight and distance between the sensor(s) 212 and item(s) 206 (e.g., current level of item 208) utilizing a source/detector or transmitter/receiver. In embodiments, the service provider computers may be configured to determine a distance from the sensor(s) 212 and item(s) 206 (e.g., current level of item 208) using the sensor data obtained by the sensor(s) 212.

For example, the elapsed time period between the transmission of a signal from a source to detection of the signal (e.g., from the sensor(s) 212), or at least a portion thereof, at a detector or receiver, along with the known speed of the signal (e.g., the speed of light) may be utilized to determine the distance between the source of the signal (e.g., sensor(s) 212) and the item(s) 206. The ARD 200 may be configured to transmit the sensor data obtained by sensor(s) 212 to a remote computing device separate from the ARD 200 (e.g., the service provider computer(s) 102 of FIG. 1, a cloud-based server/service, etc.). In some embodiments, the remote computing device may be configured to utilize the sensor data to calculate the distance between the sensor(s) 212 and the current level of item 208 and correlate the distance to a volume, amount, and/or quantity of the item(s) 206 left in the ARD container 204. The sensor data may be used to determine the consumption data or consumption rate of item(s) 206 and in embodiments reorder the item(s) 206 upon the amount of the item being equal to or less than the threshold level 210.

Figure 3:
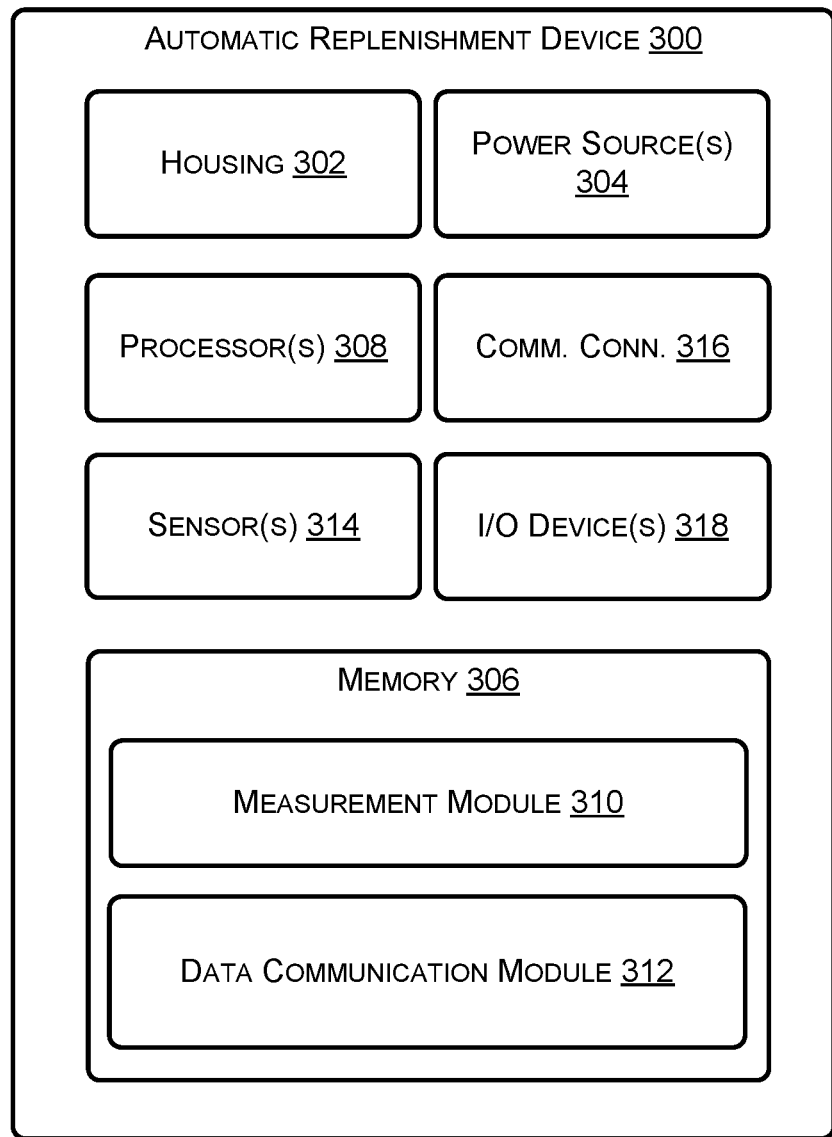
FIG. 3 illustrates a block diagram of components of an ARD, in accordance with at least one embodiment.

FIG. 3 illustrates a block diagram of components of an ARD, in accordance with at least one embodiment. The ARD 300 of FIG. 3 may be an example of the ARD 104 and 200 of FIGS. 1 and 2, respectively. The ARD 300 (or a portion of the ARD 300 such as the ARD lid 202 of FIG. 2) may include a housing 302 that may include components of ARD 300 discussed further below. In embodiments, the housing 302 may be composed of any type of material (e.g., plastic, metal, etc.), and may serve to prevent the components of the ARD 300 from being damaged or interacting or otherwise contaminating the items placed within ARD 300.

The ARD 300 may include one or more power source(s) 304 that provide power to one or more components of the ARD 300. The power source(s) 304 may include a battery, which may include a one-time use battery or a rechargeable battery. However, the power source(s) 304 may rely on power from another source providing alternating current (AC) power and may be a power inverter. For example, the ARD may be powered via a power cord that is coupled to the ARD 300 and that is detachably connected to a power outlet, such as a wall outlet. In some embodiments, the ARD 300 may include a power level detector that is configured to determine and display a power level for the ARD 300 using alpha-numeric characters that indicate a current power level of a battery of the ARD 300 and power source(s) 304. The power level may be transmitted by the ARD 300 to a remote computing device (e.g., the service provider computer(s) 102 of FIG. 1), which may track the power level of the power source(s) 304 over time. In some embodiments, the ARD 300 and/or the remote computing device may provide a notification (e.g., to a client device not pictured) of the power level via any suitable means such an e-mail message, a text message, a mobile application, a website, etc.

The ARD 300 may include at least one memory (e.g., memory 306) and one or more processing units (e.g., processor(s) 308). The processor(s) 308 may be implemented as appropriate in hardware, computer-executable instructions, software, firmware, or combinations thereof. Computer-executable instruction, software or firmware implementations of the processor(s) 308 may include computer-executable or machine-executable instructions written in any suitable programming language to perform the various functions described.

The memory 306 may include more than one memory and may be distributed throughout the ARD 300. The memory 306 may store program instructions (e.g., related to the measurement module 310 and/or the data communication module 312) that are loadable and executable on the processor(s) 308, as well as data generated during the execution of these programs. Depending on the configuration and type of memory, the memory 306 may be volatile (such as random access memory (RAM)) and/or non-volatile (such as read-only memory (ROM), flash memory, or other memory). In some implementations, the memory 306 may include multiple different types of memory, such as static random access memory (SRAM), dynamic random access memory (DRAM), or ROM.

Turning to the contents of the memory 306 in more detail, the memory 224 may include one or more application programs, modules or services for implementing the features disclosed herein including measurement module 310 and/or the data communication module 312. The measurement module 310 may include instructions that, when executed by the processor(s) 308 may cause the sensor(s) 314 to capture sensor data including distance measurements associated with the items placed on, or within, the ARD 300. A distance measurement may quantify a distance between the sensor(s) 314 and the item on/within the ARD 300. The memory 306 may be configured to store the collected sensor data. In some embodiments, the measurement module 310 may be configured to convert raw sensor data into any suitable format and/or unit. The measurement module 310 may be configured to provide sensor data and/or converted sensor data to the data communications module 312.

In some embodiments, the data communication module 312 may include instructions that, when executed by the processor(s) 308, transmit and receive data via communication connection(s) 316. The communication connection(s) 316 may include suitable communication interfaces for communicating via Bluetooth (Bluetooth Low Energy (BLE)), WiFi, a cellular connection (e.g., 3G, 4G, LTE, etc.). The communication connection(s) 316 may be configured to transmit the data to a remote computing device (e.g., the service provider computer(s) 102 of FIG. 1) or relay data to the remote computing device using a proxy device (e.g., a smartphone, a laptop, a desktop computer, or any suitable device capable of performing data transfers with the remote computing device). The communication connection(s) 316 any may utilize known or widely used communication protocols such as a wireless connection (WiFi network), a wired connection to a network, cellular network, short-range or near-field networks (e.g., Bluetooth), infrared signals, local area networks, wide area networks, the Internet, etc.

In at least one embodiment, the data communication module 312 may be configured to obtain sensor data from the measurement module 310 and/or the memory 306. The data communication module 312 may be responsible for transmitting such sensor data to a remote computing device (e.g., the service provider computer(s) 102) according to any suitable communications protocol. The sensor data may be communicated in any manner, such as via Bluetooth (Bluetooth Low Energy (BLE) may also be considered when using the term "Bluetooth"), WiFi, a cellular connection (e.g., 3G, 4G, LTE, etc.), and so on.

In at least one embodiment, the data communication module 312 may be configured to receive data via the communication connection(s) 316. For example, the data communication module 312 may be configured to receive item information (e.g., an item identifier, unit weight, material consistency, or any suitable attribute of an item) indicating an item that is placed on, or within, the ARD 300. In some embodiments, the item information or other suitable information communicated to the data communication module 312 may include/indicate conversion algorithms for converting raw sensor data into a particular format and/or unit. In still further embodiments, the data communication module 312 may be configured to receive any suitable information for instructing the measurement module 310 in a manner of collecting sensor data utilizing sensor(s) 314. By way of example, an instruction may be received by the data communication module 312 and communicated to the measurement module 310 that indicates that sensor data is to be collected according to a provided schedule, at a particular periodic rate, or the like. Generally, any suitable data that is to be transmitted or received by the ARD 300 may be processed by the data communication module 312 and provided to any other module and/or component of the ARD 300.

The ARD 300 may include sensor(s) 314 such as a time of flight sensor, or other suitable sensors such as time of flight camera sensors, scale sensors, or infrared sensors that are configured to obtain or capture sensor data of items placed on and/or within the ARD 300. The time of flight sensors may include signal transmitters and receivers that are configured to determine an amount, quantity, and/or volume of an item stored on and/or within the ARD 300 or calculate a distance from the source of the signal to the receptor of the signal which can be converted into an amount of the item stored on and/or within the ARD 300 (e.g., in the ARD container 204 of FIG. 2).

The sensor(s) 314 may be configured to periodically obtain sensor data regarding the items placed on or within the ARD 300 at predetermined intervals, such as every day, every 12 hours, every 6 hours, every hour, every 15 minutes, and so on. In some embodiments, the sensor(s) 314 may determine/sense when an item is placed on or within the ARD 300, which may cause the sensor(s) 314 to obtain sensor data associated with the item(s). The sensor(s) 314 may also be instructed (e.g., by the measurement module 310) to obtain sensor data via instructions initiated at a remote computing device (e.g., the service provider computer(s) 102). The frequency of sensor data collection performed by the sensor(s) 314 may be adjusted over time, which may be based on the rate of consumption of the items and/or the manner in which the ARD 300 is being powered. For instance, if the ARD 300 is being powered via a power cord and power outlet, the sensor data may be obtained more frequently (e.g., every hour, every 15 minutes, etc.). However, if the ARD 300 is being powered using a battery, the sensor data may be collected less frequently to conserve battery life (e.g., once per day).

The ARD 300 may also include input/output (I/O) device(s) 318 and/or ports, such as for enabling connection with a keyboard, a mouse, a pen, a voice input device, a touch input device, a display, speakers, a printer, or other I/O device. The I/O device(s) 318 may be in any suitable form to enable data to be provided to any suitable component of the ARD 300 and/or for presenting information (e.g., text, lights, sounds) at the ARD 300 (e.g., via speaker, a display, haptic feedback, etc.).

Figure 4:
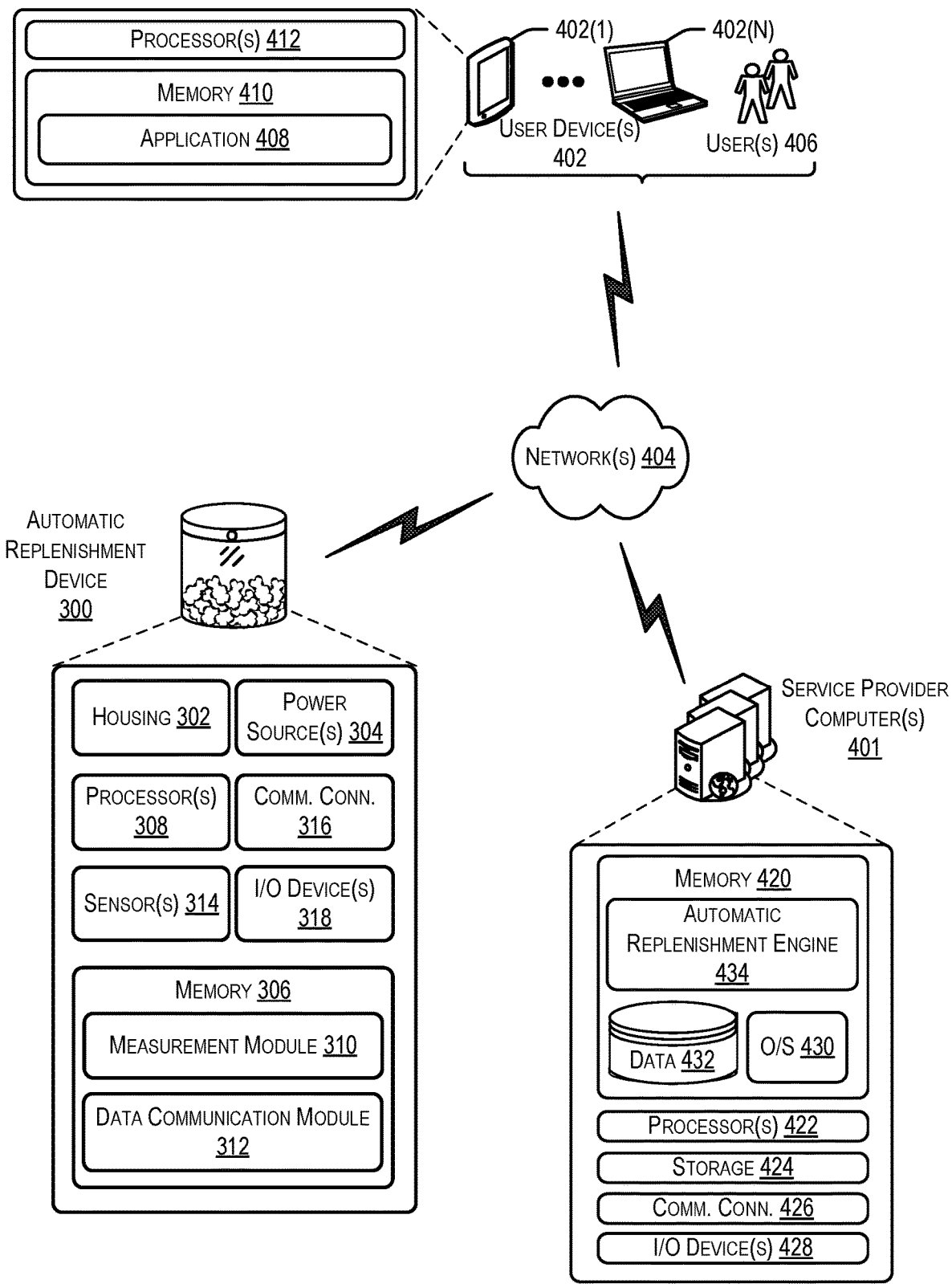
FIG. 4 illustrates an example architecture for providing sensor data corrections as described herein that includes one or more service provider computers, one or more user devices, and/or an ARD connected via one or more networks, in accordance with at least one embodiment.

FIG. 4 illustrates an example architecture 400 for providing product-specific sensor data corrections as described herein that includes one or more service provider computers 401 (e.g., the service provider computer(s) 102 of FIG. 1), one or more user devices 402, and/or an ARD (e.g., ARD 300) connected via one or more networks 404, in accordance with at least one embodiment. In architecture 400, one or more users 406 (e.g., customers, users, consumers, etc.,) may utilize user computing devices 402(1)-(N) (collectively, user devices 402) to access application 408 (e.g., a browser application, a shopping application, etc.) or a user interface (UI) accessible through the application 408. In embodiments, the user devices 402 may include one or more components for enabling the user(s) 406 to interact with the application 408.

The user devices 402 may include at least one memory 410 and one or more processing units or processor(s) 412. The memory 410 may store program instructions that are loadable and executable on the processor(s) 412, as well as data generated during the execution of these programs. Depending on the configuration and type of the user devices 402, the memory 410 may be volatile (such as random access memory (RAM)) and/or non-volatile (such as read-only memory (ROM), flash memory, etc.). The user devices 402 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 402. In some implementations, the memory 410 may include multiple different types of memory, such as static random access memory (SRAM), dynamic random access memory (DRAM), or ROM.

Turning to the contents of the memory 410 in more detail, the memory 410 may include an operating system and one or more application programs or services for implementing the features disclosed herein. Additionally, the memory 410 may include one or more modules for implementing the features described herein including the automatic replenishment module 414.

The architecture 400 may also include one or more service provider computers 401 (e.g., an example of the service provider computer(s) 102 of FIG. 1) that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 401 may implement or be an example of the service provider computer(s) described herein. The one or more service provider computers 401 may also be operable to provide site hosting, media streaming services, computer application development, and/or implementation platforms, combinations of the foregoing, or the like to the one or more users 406 via user devices 402.

In some examples, the networks 404 may include any one or a combination of many different types of networks, such as cable networks, the Internet, wireless networks, cellular networks, and other private and/or public networks. While the illustrated examples represents the users 406 communicating with the service provider computers 401 over the networks 404, the described techniques may equally apply in instances where the users 406 interact with the one or more service provider computers 401 via the one or more user devices 402 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 401 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 401 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 401 may be in communication with the user devices 402 and/or the ARD 300 via the networks 404, or via other network connections. The one or more service provider computers 401 may include one or more servers, perhaps arranged in a cluster or as individual servers not associated with one another.

In one illustrative configuration, the one or more service provider computers 401 may include at least one memory 420 and one or more processing units or processor(s) 422. The processor(s) 422 may be implemented as appropriate in hardware, computer-executable instructions, firmware, or combination thereof. Computer-executable instruction or firmware implementations of the processor(s) 422 may include computer-executable or machine-executable instructions written in any suitable programming language to perform the various functions described when executed by a hardware computing device, such as a processor. The memory 420 may store program instructions that are loadable and executable on the processor(s) 422, as well as data generated during the execution of these programs. Depending on the configuration and type of the one or more service provider computers 401, the memory 420 may be volatile (such as RAM) and/or non-volatile (such as ROM, flash memory, etc.). The one or more service provider computers 401 or servers may also include additional storage 424, which may include removable storage and/or non-removable storage. The additional storage 424 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 816 may include multiple different types of memory, such as SRAM, DRAM, or ROM.

The memory 420, the additional storage 424, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 420 and the additional storage 424 are all examples of non-transitory computer storage media. Additional types of non-transitory computer storage media that may be present in the one or more service provider computers 401 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 401. Combinations of any of the above should also be included within the scope of non-transitory computer-readable media.

The one or more service provider computers 401 may also contain communication connection interface(s) 426 that allow the one or more service provider computers 401 to communicate with a data store, another computing device or server, user terminals, and/or other devices on the networks 404. The one or more service provider computers 401 may also include I/O device(s) 428, such as a keyboard, a mouse, a pen, a voice input device, a touch input device, a display, speakers, a printer, etc.

Turning to the contents of the memory 420 in more detail, the memory 420 may include an operating system 430, one or more data stores 432, and/or one or more application programs or services for implementing the features disclosed herein including the automatic replenishment engine 434 (e.g., an example of the automatic replenishment engine 118 of FIG. 1). In accordance with at least one embodiment, the automatic replenishment engine 434 may be configured to maintain a user profile associated with a user, determine a current fill level associated with an item situated on or within an ARD, correct error in sensor data received from an ARD, or the like. The automatic replenishment engine 434 will be discussed in further detail below with respect to FIG. 5.

The architecture 400 also includes the ARD 300 of FIG. 3. As disclosed herein, the ARD 300 may be configured, among other things, to utilize sensor(s) 314 to obtain sensor data associated with items situated on or within the ARD 300.

Figure 5:
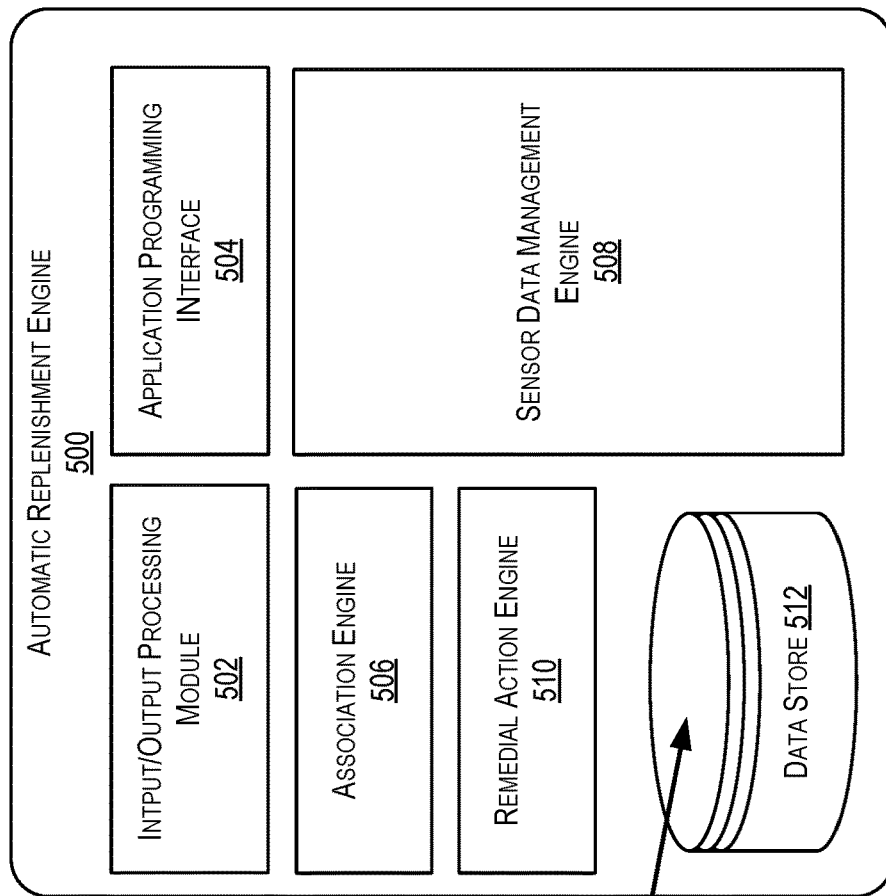
FIG. 5 illustrates a block diagram of components of an automatic replenishment engine, in accordance with at least one embodiment.

FIG. 5 illustrates a block diagram of components of an automatic replenishment engine 500, in accordance with at least one embodiment. Automatic replenishment engine 500 may be an example of the automatic replenishment engine 434 of FIG. 4. As shown, the example embodiment includes a number of modules including, but not limited to, an input/output processing module 502, an application programming interface 504, an association engine 506, a sensor data management engine 508, and a remedial action engine 510. It should be appreciated that each module of FIG. 5 may be executed on a single computer, and or each component, or sets of components may be executed on separate computers. The modules/engines of FIG. 5 may be communicatively coupled to the data store 512 (e.g., the data store 432 of FIG. 4) such that data may be exchanged between the modules/engines and the data store 512.

In at least one embodiment, the automatic replenishment engine 500 includes the application programming interface 504. Generally, the application programming interface 504 may be utilized to receive and/or provide any suitable information to and/or from the automatic replenishment engine 500 (or modules of the automatic replenishment engine 500) with respect to any of the examples provided herein.

In the embodiment shown in the drawings, the input/output processing module 502, a component of the automatic replenishment engine 500, may be configured to provide one or more user interfaces associated with the automatic replenishment engine 500. Such interfaces may be provided via the service provider computer(s) 102 and/or service provider computer(s) 401 of FIGS. 1 and 4, respectively. In some embodiments, the input/output processing module 502 may be configured to receive mapping 514. Mapping 514 may include associations at least between item identifiers, material-specific offsets, and material-specific signal return rates, although additional information may be stored with mapping 514. The mapping 514 may be stored within data store 512 or another suitable storage location accessible to the input/output processing module 502. It should be appreciated that mapping 514 may be stored with any suitable number of mappings available within the data store 512. These mappings may be specific to a specific automatic replenishment device, dimensions/storage capacity of an automatic replenishment device, and/or a sensor (or type of sensor) utilized to obtain sensor data. For example, mapping 514 may be associated with a particular ARD and/or a storage capacity (e.g., 2.5 quarts, 4.5 quarts, 30 lbs., etc.) and/or a particular type of sensor (e.g., a time-of-flight sensor).

In some cases, the input/output processing module 502 may be configured to provide interface(s) for collecting user account information and/or association information related to an item (e.g., the item(s) 110 of FIG. 1) and an ARD (e.g., the ARD 104, 200, 300, and/or 400 of FIGS. 1-4). The input/output processing module 502 may be configured to stored received user account information and/or association information within a user profile associated with a user. In some embodiments, the user profile may be stored within the data store 512 or at another suitable storage location accessible to the input/output processing module 502.

In some embodiments, the input/output processing module 502 may be configured to provide a calculated fill level of an item contained in an ARD. The calculated fill level may be presented via one or more interfaces provided by the input/output processing module 502 and/or the service provider computer(s) 102 and 401, and/or via a notification (e.g., email, text message, push notification etc.) provided by the input/output processing module 502.

It should be appreciated that the input/output processing module 502 may be configured to receive and provide sensor data to any suitable component of the automatic replenishment engine 500.

In some embodiments, the association engine 506 may be configured to receive account information and/or association information (e.g., from the input/output processing module 502). Once received, the association engine 506 may generate and/or store the received account information and/or association information in a user profile maintained by the service provider computer(s) 102 and/or 401. In some examples, the user profile, including the account information and/or the association information may be stored at the data store 512 or another suitable storage location accessible to the association engine 506.

In some embodiments, the sensor data management engine 508 may be configured to receive sensor data (e.g., via the input/output processing module 502). The received sensor data may have been generated by one or more sensors of the ARDs 104, 200, 300, and/or 400 of FIGS. 1-4. The received sensor data may include at least a distance measurement (e.g., quantifying a distance between the sensor and an item within the ARD) and a signal return rate. As described above, the received distance measurement may include some amount of error due to a transmissivity of the item.

In at least one embodiment, the sensor data management engine 508 may receive the sensor data. An item may be identified (e.g., from the user profile), the item being associated with the ARD for which the sensor data was generated. Once the item is identified, the sensor data management engine 508 may identify and consult the mapping 514. It should be appreciated that mapping 514 may be identified from any suitable number of mappings available within the data store 512. As discussed above, these mappings may be specific to a particular automatic replenishment device, dimensions/storage capacity of an automatic replenishment device, and/or a sensor (or type of sensor) utilized to obtain sensor data. In some examples, mapping 514 may include various material-specific offsets for a particular item (e.g., gummi bear brand x) that correspond to particular ARDs and/or types of ARDs and/or types of sensors. That is, the mapping 514 may indicate that the item is associated with a particular material-specific offset for an ARD having a storage capacity of 2.5 quarts and a different material-specific offset for an ARD having a storage capacity of 4.5 quarts. Similarly, the mapping 514 may include various signal return rates corresponding to particular ARDs, particular storage capacities associated with ARDs (e.g., 2.5 quart, 4.5 quart, etc.) and/or particular types of sensors.

Once identified, the mapping 514 may be utilized to obtain a material-specific offset associated with the item, and a material-specific signal return rate (SRR) associated with the item. As discussed above, a material-specific offset may refer to an amount of known sensor data error (e.g., 20%) associated with the item. A "material-specific SRR" may be a predetermined value that indicates an expected SRR when the specific item fills a particular amount (e.g., 20%) of a similar ARD. The values contained within the mapping 514 may be learned from any suitable method such as, but not limited to, controlled testing, customer test measurement, machine learning, or the like. The mapping may indicate, for example, that a particular item (e.g., gummi bears) is associated with a material-specific offset of −44 millimeters and a material-specific SRR of 0.12 (quantifying an expected SRR when the ARD is filled with the item(s) to a particular fill level (e.g., 20%)). The sensor data management engine 508 may access a previously stored empty container SRR value quantifying an expected SRR when the ARD (or a container similar to the ARD) is empty.

In at least one embodiment, the sensor data management engine 508 may be configured to calculate an offset scale. The offset scale may be a calculated value between 0 and 1 that, when applied to a material-specific offset, reduces the material-specific offset at low fill levels to. The offset scale may be calculated to be a value of 1 when the measured fill level corresponding to the distance measurement received via the sensor data indicates (e.g., a distance measurement that is greater than a threshold value) a fill level greater than a threshold fill level (e.g., 10%, 20%, etc.) of the ARD. When the measured fill level corresponding to the distance measurement received via the sensor data indicates a fill level less than or equal to the threshold fill level (e.g., 10%, 20%, etc.) of the ARD, the offset scale may be calculated using a ratio of Signal Return Rates (SRR). In some embodiments, the goal is to gradually reduce the material-specific offset as the container empties until no offset is applied when the container is empty. The offset scale may be calculated to be a value of 0 when the measured SRR is greater than or equal to the empty container SRR and 1 when the measured SRR is less than or equal to the predefined material-specific SRR. The offset scale may range from 0 to 1 when SRR of the received sensor data is between the empty container SRR and material-specific SRR. In some examples, the offset scale may be set to 1 when the measured SRR is equal to or greater than the predetermined material-specific SRR and the measured fill level corresponding to the distance measurement via the sensor data indicates (e.g., a distance measurement that is greater than a threshold value) a fill level greater than a threshold fill level (e.g., 10%, 20%, etc.) of the ARD. In at least one embodiment, the offset scale may be determined according to the following formula:

$$\text{Offset Scale} = \frac{\text{Measured } SRR - \text{Empty Container } SRR}{\text{Material Specific } SRR - \text{Empty Container } SRR}$$

In at least one embodiment, the sensor data management engine 508 may be configured to calculate an adjusted distance based at least in part on the distance measurement received from the sensor data (measured distance), the material specific offset, and the offset scale. The adjusted distance may be calculated based on the following formulas:

Adjusted Distance=Measured Distance+Scaled Material Specific Offset Scaled Material
Offset=Material Specific Offset×Offset Scale The sensor data management engine 508 may be configured to add the scaled material-specific offset to the distance measurement provided in the sensor data to compensate for inaccuracies in the distance measurement due to the transmissivity of the item(s) being sensed. As mentioned above, the full amount of the material-specific offset may not be needed if the fill level of gummi bears within the ARD is relatively low (e.g., the bottom of the ARD may be visible). By utilizing the offset scale described above, the full material-specific offset may be added to the distance measurement when the item fills more than a threshold amount of space (e.g., 20% of the container) but scaled with the item fills less than the threshold amount of space. The sensor data management engine 508 may utilize the aforementioned formulas to calculate an adjusted distance that may more accurately indicate the actual fill level of an item in the ARD. The actual fill level may be calculated based at least in part on the adjusted distance by any suitable component of the automatic replenishment engine 500.

In some embodiments, the remedial action engine 510 may be configured to perform, or cause performance of, one or more remedial actions based at least in part on the calculated fill level determine using the adjusted distance described above. A remedial action may include, but is not limited to, presenting a current fill level of the item within the ARD, generating an order to replenish the item (e.g., to purchase an item from a provider and/or deliver the item to the user), providing a notification related to the fill level (e.g., via an email, a text message, a website, a push notification, etc.), or the like. As a non-limiting example, given a calculated fill level indicating the item fills less than 10% of the ARD, the remedial action engine 510 may cause the calculated fill level to be provided via a notification to a user device (e.g., the user device 106 of FIG. 1). Additionally, or alternatively, the remedial action engine 510 may cause the calculated fill level to be presented via an application and/or website accessible to the user device 106. In some embodiments, the remedial action engine 510 may cause a notification such as an email, a text message, and/or a push notification to be provided to the user device. The notification may include information indicating that the item is at the current fill level. The notification, in some cases, may include an option for the user to reorder the item. In at least one embodiment, the remedial action engine 510 may be configured to cause an order for the item to be generated on behalf of the user.

Figure 6:
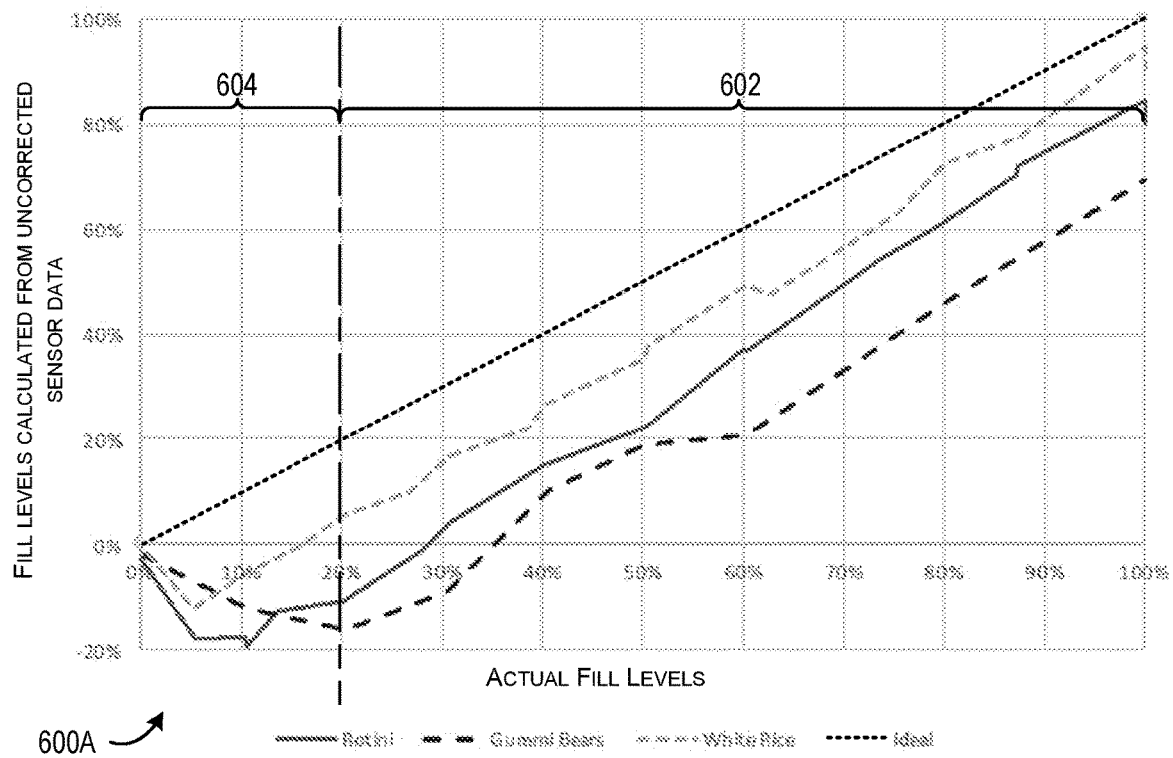
FIG. 6 includes graphs which illustrate some improvements to sensor data accuracy, according to some embodiments.
Figure 6:
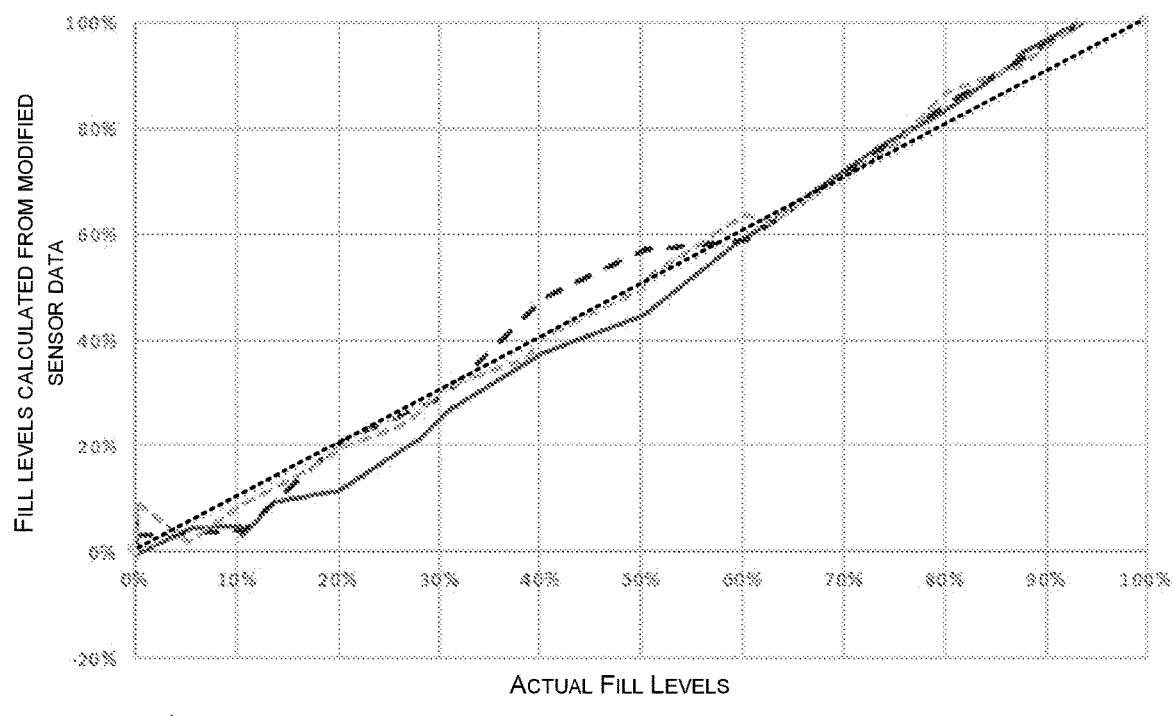

FIG. 6 includes graphs 600A and 600B which illustrate some improvements to sensor data accuracy, according to some embodiments. Graph 600A is intended to depict fill level inaccuracies due to uncorrected sensor data. As can be seen via graph 600A, the fill levels calculated from the inaccurate sensor data appear to fairly consistently off within range 602, while the fill levels calculated from the inaccurate sensor data appears to vary more wildly within range 604. Utilizing the techniques described herein, the fill levels may be calculated on the modified sensor data to produce the more accurate fill levels indicated within graph 600B.

Figure 7:
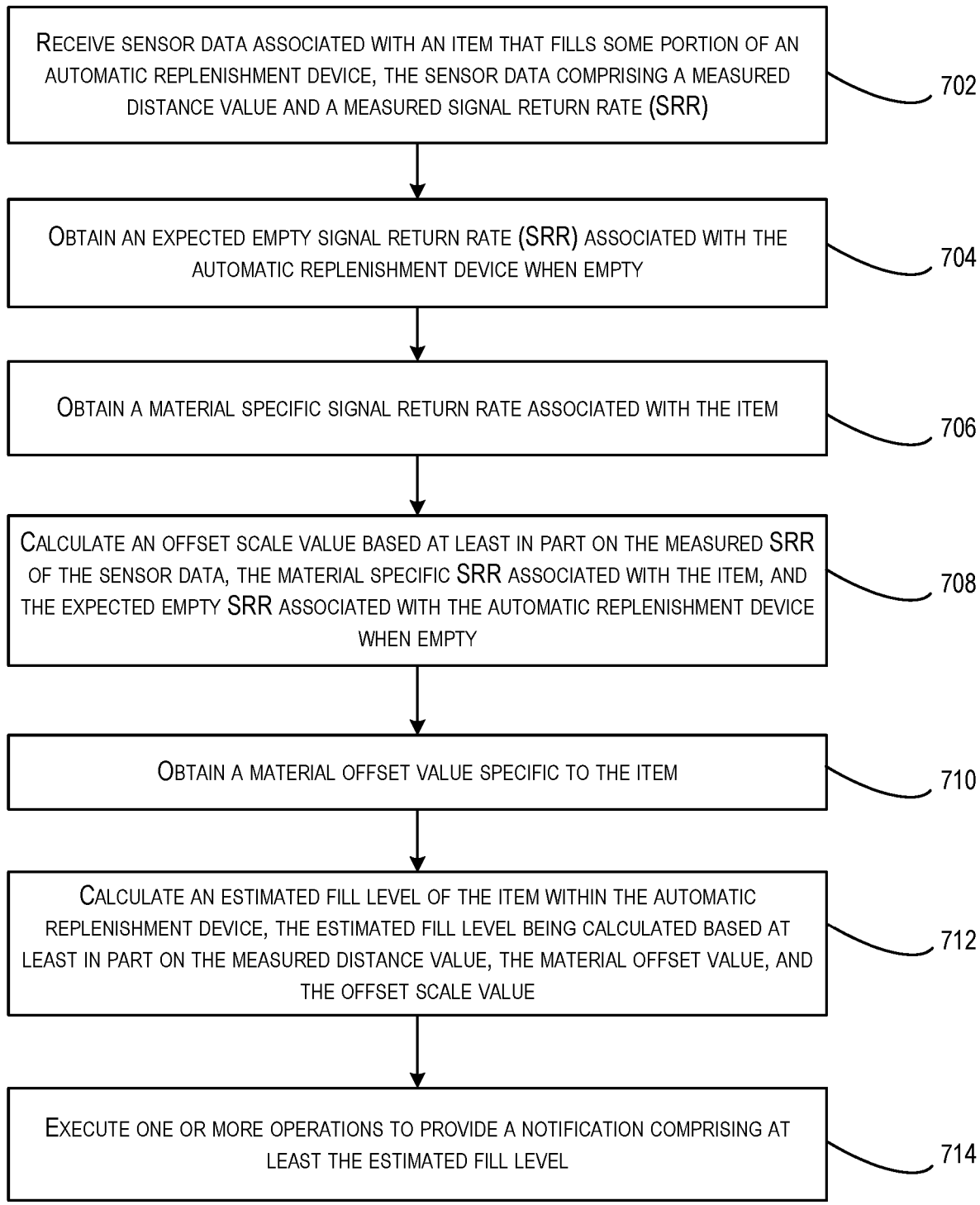
FIG. 7 illustrates a flow diagram of a process for providing sensor data corrections, in accordance with at least one embodiment.

FIG. 7 illustrates a flow diagram of a process for providing sensor data corrections, in accordance with at least one embodiment. The method 700 may be performed by one or more components of the automatic replenishment engine 500. The method 700 may performed in any suitable order. It should be appreciated that the method 700 may include a greater number or a lesser number of steps than that depicted in FIG. 7.

The method may begin at 702, where a sensor data associated with an item that fills some portion of an automatic replenishment device may be received by a computing device (e.g., sensor data management engine 508 of FIG. 5). In some embodiments, the automatic replenishment device comprises one or more sensors configured to collect the sensor data. The sensor data may comprise a measured distance value that quantifies a distance between the sensor and the item. The sensor data may additionally comprise a measured signal return rate that quantifies an amount of light returned to the sensor when collecting the measured distance value.

At 704, an expected empty signal return rate may be obtained by the computing device (e.g., the sensor data management engine 508). In some embodiments, the expected signal return rate may be associated with the automatic replenishment device when empty.

At 706, a material specific signal return rate may be obtained by the computing device (e.g., the sensor data management engine 508). In some embodiments, the material specific signal return rate may indicate an expected SRR when the specific item fills a particular amount (e.g., 20%) of a similar ARD.

At 708, an offset scale value may be calculated by the computing device (e.g., the sensor data management engine 508). The offset scale value may be based at least in part on the measured signal return rate of the sensor data, the material specific signal return rate associated with the item, and the expected empty signal return rate associated with the automatic replenishment device when empty.

At 710, a material offset value specific to the item may be obtained by the computing device (e.g., the sensor data management engine 508). At 712, an estimated fill level of the item within the automatic replenishment device may be calculated by the computing device (e.g., the sensor data management engine 508). In some embodiments, the estimated fill level may be calculated based at least in part on the measured distance value, the material offset value, and the offset scale value.

At 714, one or more operations may be executed by the computing device (e.g., the remedial action engine 510). For example, the one or more operations may cause the computing device to provide a notification (e.g., to the user device 106 of FIG. 1) comprising at least the estimated fill level. The one or more operations may further comprise generating, or causing generation of, an automated order for reordering the item.

Figure 8:
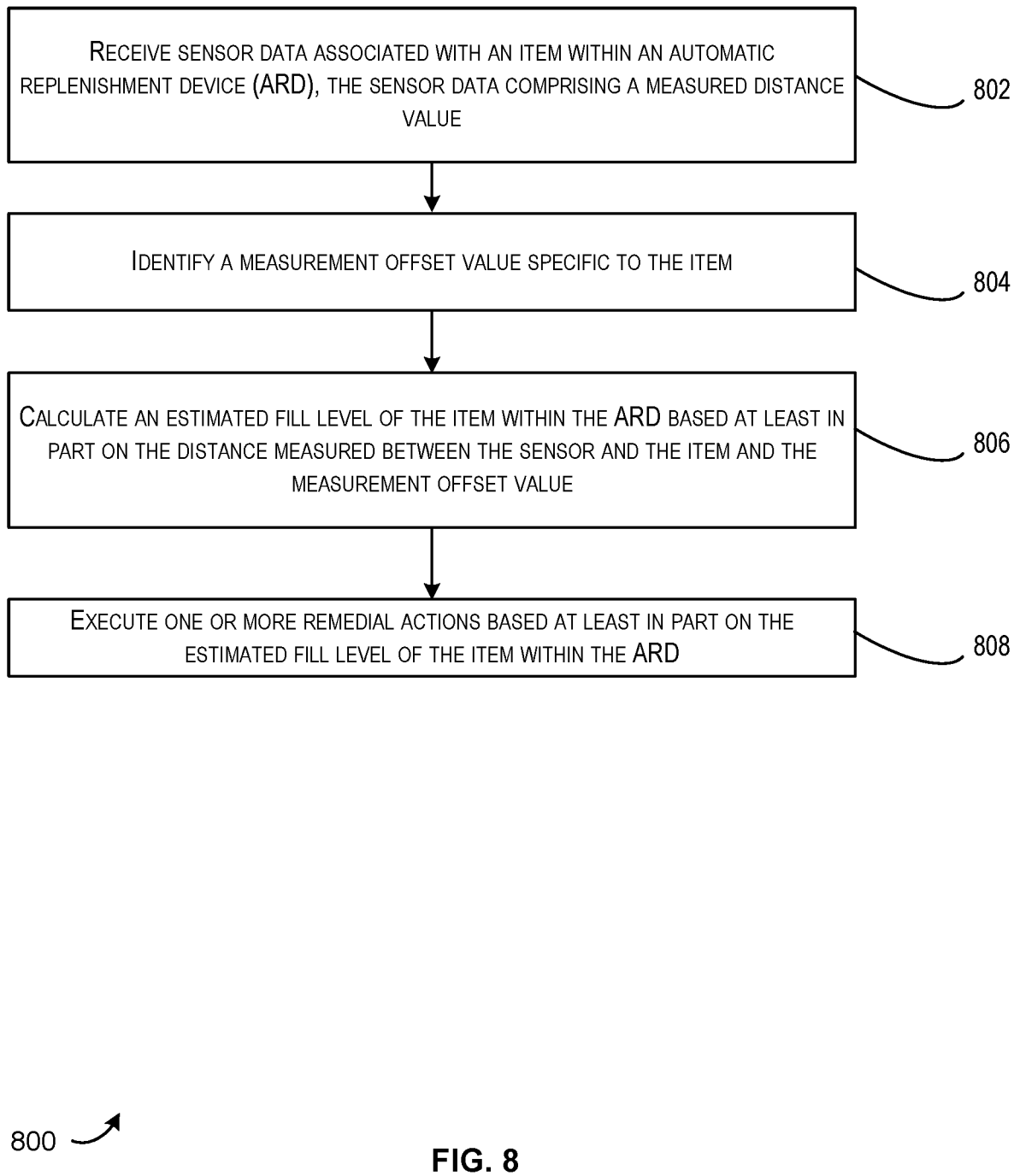
FIG. 8 illustrates a flow diagram of another process for providing sensor data corrections, in accordance with at least one embodiment.

FIG. 8 illustrates a flow diagram of another process for providing sensor data corrections, in accordance with at least one embodiment. The method 800 may be performed by one or more components of the automatic replenishment engine 500. The method 800 may performed in any suitable order. It should be appreciated that the method 800 may include a greater number or a lesser number of steps than that depicted in FIG. 8. In some embodiments, the method 800 may be performed by a system comprising a processor and a memory that stores computer-readable instructions that, upon execution by the processor, configure the system to perform the method 800. In some embodiments, a computer-readable storage medium may comprise computer-readable instructions that, upon execution by a computer system, configure the computer system to perform operations comprising the method 800.

The method may begin at 802, where sensor data associated with an item within an automatic replenishment device (ARD) is received (e.g., by the sensor data management engine 508 of FIG. 5). In some embodiments, the ARD may comprise a sensor configured to collect the sensor data. The sensor data may comprise a distance (e.g., a distance measurement) between the sensor and the item.

At 804, a measurement offset value specific to the item may be identified (e.g., by the sensor data management engine 508). In some embodiment, the measurement offset value may be identified from a predetermined mapping (e.g., the mapping 514 of FIG. 5). As discussed above, the measurement offset value could alternatively be identified by obtaining a measurement offset value associated with another item that is similar to the item. Additionally, or alternatively, the measurement offset value may be identified by stimulating the user to fill the ARD to some level (e.g.,  20%), collecting sensor data from the ARD, and calculating a measurement offset value for the item from the collected sensor data.

At 806, an estimated fill level of the item within the ARD may be calculated (e.g., by the sensor data management engine 508). In some embodiments, the estimated fill level of the item may be calculated based at least in part on the distance measured between the sensor and the item and the measurement offset value.

At 808, one or more remedial actions may be executed (e.g., by the remedial action engine 510) based at least in part on the estimated fill level of the item within the ARD. For example, execution of the one or more remedial actions may cause the computing device to provide a notification (e.g., to the user device 106 of FIG. 1) comprising at least the estimated fill level. Execution of the one or more remedial actions may further comprise generating, or causing generation of, an automated order for reordering the item.

Figure 9:
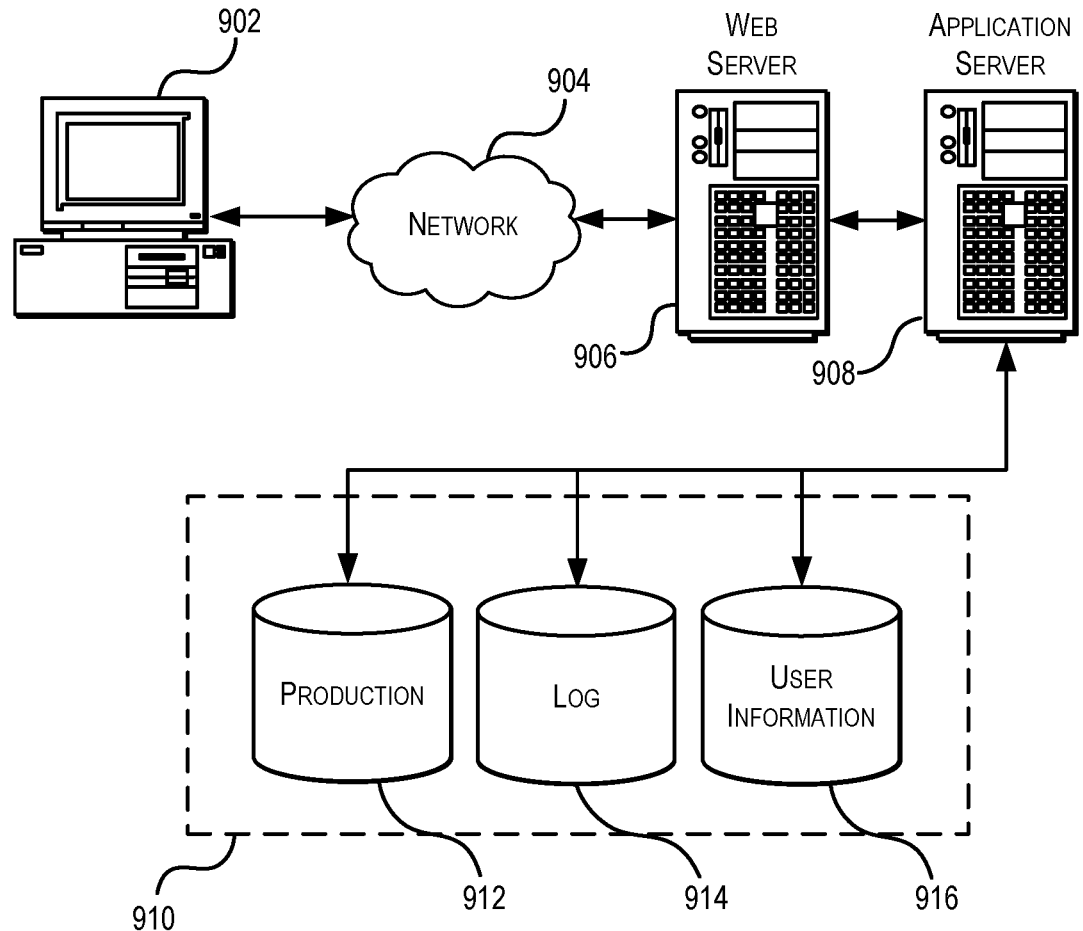
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing device, sensor data associated with an item that fills some portion of an automatic replenishment device, the automatic replenishment device comprising a sensor configured to collect the sensor data, the sensor data comprising a measured distance value that quantifies a distance between the sensor and the item, the sensor data further comprising a measured signal return value that quantifies an amount of light returned to the sensor when collecting the measured distance value;
   obtaining, by the computing device from memory, an expected empty signal return value associated with the automatic replenishment device when empty;
   obtaining, by the computing device from memory, a material-specific signal return value associated with the item;
   calculating, by the computing device, an offset scale value based at least in part on the measured signal return value of the sensor data, the material-specific signal return value associated with the item, and the expected empty signal return value associated with the automatic replenishment device when empty, wherein the offset scale value is at or above a lower limit value and less than an upper limit value when the measured signal return value is greater than the material-specific signal return value;

obtaining, by the computing device, a material offset value specific to the item;

scaling the material offset value based at least in part on the offset scale value, the offset scale value causing a reduction of the material offset value when the offset scale value is less than the upper limit value;

calculating, by the computing device, an estimated fill level of the item within the automatic replenishment device, the estimated fill level being calculated based at least in part on the measured distance value and the material offset value; and executing, by the computing device, one or more operations to provide a notification comprising at least the estimated fill level.

2. The computer-implemented method of claim 1, wherein the material offset value is obtained from a predetermined mapping that associates particular material offset values with particular items.

3. The computer-implemented method of claim 1, wherein calculating the estimated fill level of the item comprises:

adding the material offset value to the measured distance value to generate an adjusted distance value; and calculating the estimated fill level based at least in part on the adjusted distance value.

4. The computer-implemented method of claim 1, wherein scaling the material offset value according to the offset scale value causes the material offset value to be smaller for measured distance values over a threshold value.

5. A system, comprising:

a processor; and a memory storing computer-readable instructions that, upon execution by the processor, configure the system to:

receive sensor data associated with an item within an automatic replenishment device (ARD), the ARD comprising a sensor configured to collect the sensor data, the sensor data comprising a measured signal return value that quantifies a distance between the sensor and the item;

identify a measurement offset value specific to the item;

calculate an offset scale value based at least in part on the measured signal return value, an expected signal return value associated with a container of the item when empty, and a predetermined material-specific signal return value associated with the item, wherein the offset scale value is at or above a lower limit value and less than an upper limit value when the measured signal return value is greater than the predetermined material-specific signal return value;

adjust the measurement offset value to an adjusted measurement offset value based at least in part on the offset scale value, the offset scale value causing a reduction of the measurement offset value when the offset scale value is less than the upper limit value;

calculate an estimated fill level of the item within the ARD based at least in part on the distance measured between the sensor and the item and the adjusted measurement offset value; and execute one or more remedial actions based at least in part on the estimated fill level of the item within the ARD.

6. The system of claim 5, wherein the item allows over a threshold amount of light to pass through it.

7. The system of claim 5, wherein the offset scale value is set to the upper limit value when the measured signal return value is less than or equal to the predetermined material-specific signal return value.

8. The system of claim 5, wherein the offset scale value is set to the lower limit value when the measured signal return value is greater than or equal to the expected signal return value associated with the ARD when empty.

9. The system of claim 5, wherein calculating estimated fill level using the offset scale value and the measurement offset value compensates for an amount of sensor inaccuracy of the sensor due to an amount of transmissivity of the item.

10. The system of claim 5, wherein the predetermined material-specific signal return value is initially calculated based at least in part on historical sensor data associated with the item and machine learning techniques.

11. The system of claim 5, wherein the remedial actions include at least one of: generating an automated order for the item, providing the estimated fill level for display on a user device, or providing a notification to the user device indicating the estimated fill level of the item in the ARD.

12. A computer-readable storage medium comprising computer-readable instructions that, upon execution by a computer system, configure the computer system to perform operations comprising:

obtaining, from a sensor positioned on an automatic replenishment device (ARD), a distance between the sensor and an item contained within the ARD and a measured signal return value that quantifies an amount of light returned to the sensor when measuring the distance;

calculate an offset scale value related to the item based at least in part on the measured signal return value, an expected signal return value associated with the ARD when empty, and a predetermined material-specific signal return value, wherein the offset scale value is at or above a lower limit value and less than an upper limit value when the measured signal return value is greater than the predetermined material-specific signal return value;

identify a measurement offset value specific to the item;

scale the measurement offset value according to the offset scale value, wherein scaling the measurement offset value according to the offset scale value causes a reduction of the measurement offset value when the offset scale value is less than the upper limit value;

calculate an corrected fill level of the item within the ARD based at least in part on the distance measured between the sensor and the item and the scaled measurement offset value; and provide, to a user device, a notification indicating the corrected fill level within the ARD.

13. The computer-readable storage medium of claim 12, wherein the expected signal return value associated with the ARD when empty and the predetermined material-specific signal return value are identified from a mapping associated with the item and a container size corresponding to the ARD.

14. The computer-readable storage medium of claim 12, wherein the offset scale value is 0 when the measured signal return value is greater than or equal to the expected signal return value associated with the ARD when empty, and wherein the offset scale value is 1 when the measured signal return value is less than or equal to the predetermined material-specific signal return value, and wherein the offset scale value is incrementally decreased from 1 to 0 as the measured signal return value falls below the predetermined material-specific signal return value and approaches the expected signal return value associated with the ARD when empty.

15. The computer-readable storage medium of claim 12, wherein the offset scale value adjusts a portion of the measurement offset value to be added to the distance measured to compensate for sensor inaccuracies.

16. The computer-readable storage medium of claim 12, wherein the sensor is a time-of-flight sensor.

17. The computer-readable storage medium of claim 16, wherein the expected signal return value associated with the ARD when empty is a fixed value that is independent of the item contained in the ARD.

18. The computer-readable storage medium of claim 12, wherein the expected signal return value is set at a value that is dependent on dimensions associated with the ARD.

19. The computer-readable storage medium of claim 12, wherein the corrected fill level of the item within the ARD is calculated by adding the scaled measurement offset value to the distance measured between the sensor and the item.

* * * * *